Feb. 2, 1971 R. W. GILMAN 3,559,238
WALKING DIE PELLET MILL AND IMPROVEMENTS THEREFOR
Filed July 11, 1967 3 Sheets-Sheet 2

INVENTOR.
ROBERT W. GILMAN
BY Charles O Bruce
ATTORNEY

United States Patent Office 3,559,238
Patented Feb. 2, 1971

3,559,238
WALKING DIE PELLET MILL AND IMPROVEMENTS THEREFOR
Robert W. Gilman, San Francisco, Calif., assignor to California Pellet Mill Company, San Francisco, Calif.
Filed July 11, 1967, Ser. No. 652,539
Int. Cl. B29f 3/01
U.S. Cl. 18—12                                             8 Claims

ABSTRACT OF THE DISCLOSURE

An apparatus for securing a die to the frame of an extrusion mill including segmental wedge rings which engage trapezoidal flanges on the die and are wedged within annular flanges on the frame thereof with clamping means for interlocking the wedge rings in the frame. An apparatus for retarding the downward flow of extrusion material into an extrusion mill having a horizontal radially perforated die comprising helical like blades disposed internally of the die and which rotate ahead of and above the extrusion rollers. An apparatus for retaining extrusion rollers in operating position internally of the die of an extrusion mill comprising a cover plate which is secured to drive posts and supports the upper ends of the roller journal shafts. An apparatus for adjusting rollers of an extrusion mill comprising an adjustable link extending between a drive post in the roller assembly and a radial extension arm secured to the roller journal shaft which has a journal center eccentric of its roll center. An extrusion assembly for a walking die pellet mill characterized by a segmental wedge ring which engages a trapezoidal flange on the extrusion die to secure the die to the frame of the mill, by extrusion material flow retarders formed of helical like blades which rotate ahead of and above the extrusion rollers, by a drive plate secured to drive posts and supports the upper ends of the roller journal shafts retaining the rollers in operating position, and by a roller adjustment means which includes adjustable links extending between said drive posts and radial extension arms secured to the roller journal shafts which have their journal centers eccentric of their roll centers.

BACKGROUND OF THE INVENTION

The present invention pertains to improvements in radially perforated die pellet mills and more particularly to the extrusion assembly of a walking die pellet mill having a novel means for securing the die to the frame of the mill, extrusion material flow retarders, and separate novel means for retaining and adjusting the extrusion rollers.

Pellet mills of the type to which the present invention pertains are well known. An example of such is the extrusion mill of U.S. Pat. No. 2,240,660 to E. T. Meakin, issued May 6, 1941. More closely related to the present invention is the extruding apparatus of U.S. Pat. No. 2,295,743 to E. T. Meakin, issued Sept. 15, 1942.

One of the principal problems in making a machine having a radially perforated die is in providing securing means for holding the die to the frame of the mill. Enormous pressures are exerted upon the die by the extrusion rolls which rotate around the internal surface of the die. It has been common practice in the past to tap the edges of the die and to use bolts to secure the die to the frame of the machine as shown in aforementioned U. S. Pat. No. 2,295,743 or to use die clamps as shown in aforementioned U.S. Pat. No. 2,240,660. However, the former method has certain disadvantages in that the tapping of the holes greatly weakens the die structure and the continuous alternating pressures of the extrusion rolls tend to work the die loose. To permit the holes to be tapped in the edge of the die, it has been necessary to make dies otherwise unnecessarily thick to prevent the holes from causing structural failure. In addition, an excessive number of bolts are required to prevent the die from working loose. This makes the operation of changing a die, or turning it over, an unnecessarily tedious and strenuous job. The die clamp has also proven unsatisfactory as it requires numerous bolts to withstand the extrusion pressures and likewise is subject to working loose.

In an effort to eliminate the problem of the die working loose and of the die being structurally weakened as a result of having securing holes made around the sides thereof, applicant has devised a new means for securing the die to the extrusion mill frame and for permitting the absorption of the forces placed thereon. In addition, the novel securing means requires considerably less time to loosen when changing the die as a result of having fewer bolts to manipulate.

It is a fundamental problem in extrusion mills having horizontal dies to obtain uniform extrusion across the face of the die and that wear across the working surface of the die is usually uneven. This is caused by uneven distribution of extrusion material across the face of the die during operation because the force of gravity tends to load the bottom holes of the die more than the upper holes. Longer pellets are generally extruded from the lower holes and they receive a disproportionate amount of the wear. Applicant's invention includes a means for retarding the rate of flow of raw feed material into the space between the rollers and the die. This prevents a packing of the raw material around the lower edge of the working face of the die; provides a proper rate of fall which effects uniform extrusion; and alleviates the problem of uneven wear on the internal surface of the die. Additionally, applicant's die is reversible to permit equal wear on both edges of the working surface to be absorbed.

It is a further problem in pellet mills to keep the extrusion rollers accurately tracking and securely held in position on the internal or working surface of the die. In most extrusion mills having a radially perforated die, and not just mills with a horizontal die, the raw feed or extrusion material is generally unevenly distributed across the working surface with a continuous loading of one edge. This produces a tendency for the extrusion roller to "wander" across the working surface of the die away from the packed edge and work loose. Applicant provides a secure means for retaining the extrusion rollers in position to prevent this.

It is still a further problem in extrusion mills of this type to provide a rigid yet accurate adjustment means for positioning an extrusion roller relative to the internal surface of the die. Applicant provides a rigid adjustment means which is infinitely accurate within its range of operation and which is readily accessible for adjustment.

One of the primary problems in extrusion mills results from the fact that they operate by exerting and constraining tremendous pressures during operation. In an effort to reduce the size of these machines to save floor space and costs of material, extrusion mills are highly stressed and accurately designed mechanisms. It is necessary that they also be provided with the facility for easy maintenance and adjustment to lower down time on such expensive machinery. Applicant provides an extrusion mill in which the die can be easily changed or turned over and on which critical adjustment can be quickly made. This is accomplished through an improved and novel extrusion assembly.

SUMMARY OF THE INVENTION

The present invention is an improved extrusion assembly for an extrusion mill which employs a radially perforated die and has a frame forming a horizontal stationary support ring surrounded by a housing. The assembly includes: A die securing means having a radially perforated annular die disposed concentrically on the support ring and having mirror image first and second annular trapezoidal flanges, a segmental wedge ring having a cross section complementary to the first trapezoidal flange of the die disposed between the die and the support ring, said wedge ring being secured to the support ring and engaging the die in captured relation, said wedge ring engageable with the second of the trapezoidal flanges of the die when the die is inverted whereby the die is reversible; a main drive shaft supported for rotation concentric to the die; a roller assembly supported by the main drive shaft and having at least one fixed main shaft drive post secured to the drive shaft, at least one roller journal shaft journalled in the drive shaft, and an extrusion roller journalled on the roller journal shaft; an extrusion roller retaining means having a drive plate secured to said drive post and restrained against movement with respect to the axis of the journal shaft and surrounding the journal shaft to restrain the roller from more than limited movement along the journal shaft; extrusion material flow retarders having at least one helical like blade supported ahead of and above the roller and inclined downward in the direction of rotation of the roller assembly to support the overlying mass of material being fed downwardly by gravity into the path of the roller between the roller and the die, and means for rotating the blade ahead of the roller in spaced relation thereto and; a roller adjustment means having an eccentric relation between the journal center and the roll center of the roller journal shaft, a radial extension arm secured to the roller shaft, and turnbuckle means extending between the main shaft drive post and the extension arm whereby as the length of the turnbuckle is changed the roller shaft is rotated within its journal in the drive shaft to vary the position of the roll center of the roller journal shaft with respect to the die.

It is therefore an important object of the present invention to provide a die securing means for an extrusion mill which permits the die to "walk" and absorb the extrusion forces during operation.

It is another object of the present invention to provide a means for securing the die to the frame of the extrusion mill which permits the die to be made without holes tapped into the edges of the die.

It is a further object of the present invention to provide a means for securing the die into the frame of the extrusion mill which permits it to be easily exchanged or inverted to effect equal wear across the die.

It is yet another object of the present invention to provide extrusion material flow retarders which alleviate the problem of uneven loading of the extrusion mill in the area immediately in front of the extrusion rollers whereby uneven wear on the surface of the die is inhibited and a uniform product is produced.

It is yet a further object of the present invention to provide an extrusion roller retaining means which prevents the extrusion rollers from working out of their prescribed track or coming loose during operation.

It is still another object of the present invention to provide a roller adjustment means for adjusting the relation of the extrusion roller with respect to the working surface of the die which is infinitely adjustable within its range of adjustment.

And still a further object of the present invention is to provide an improved extrusion assembly for an extrusion mill employing a horizontal radially perforated extrusion die.

DESCRIPTION OF THE PREFERRED EMBODIMENTS

Figure 1:
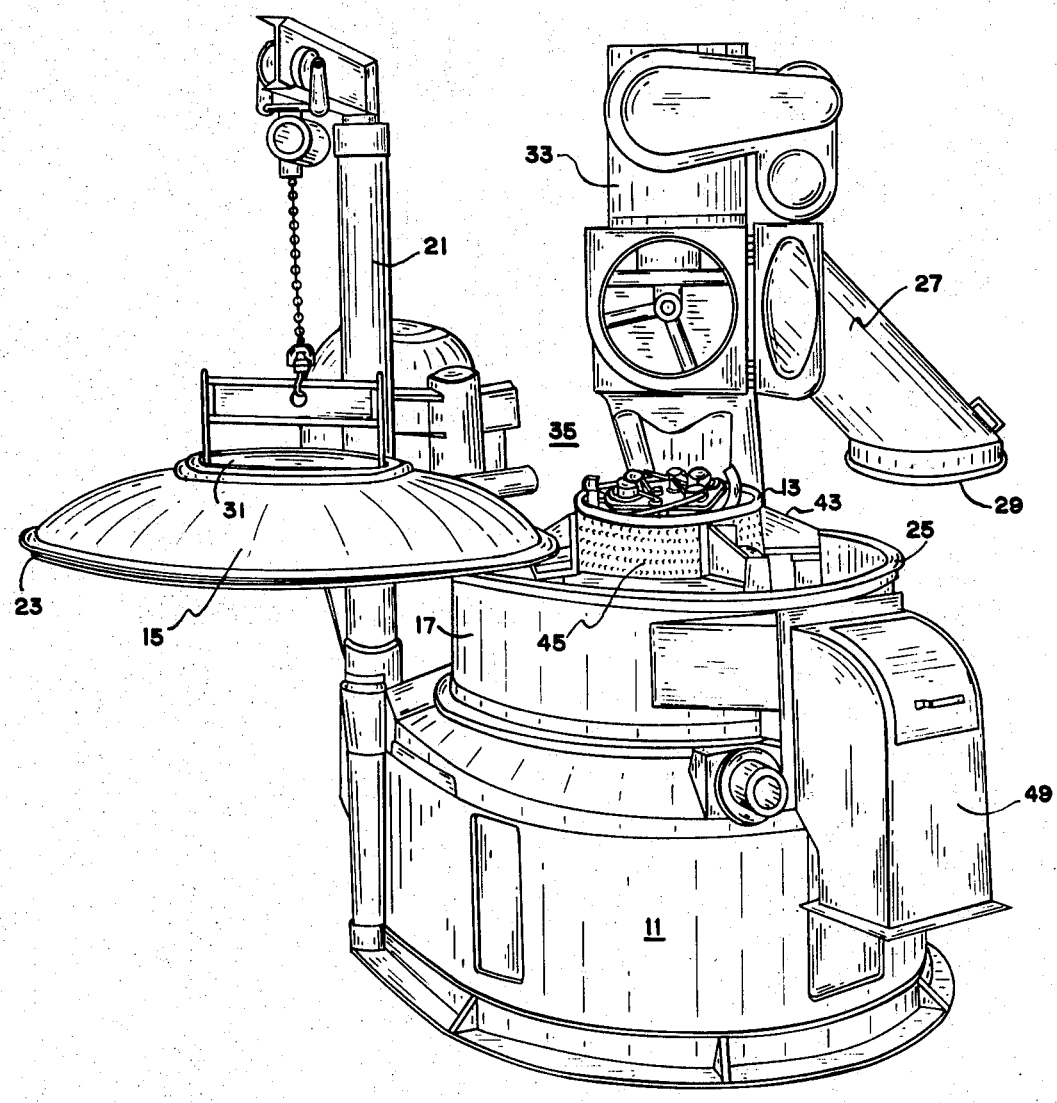
FIG. 1 is a perspective view of the walking die pellet mill of the present invention.
Figure 2:
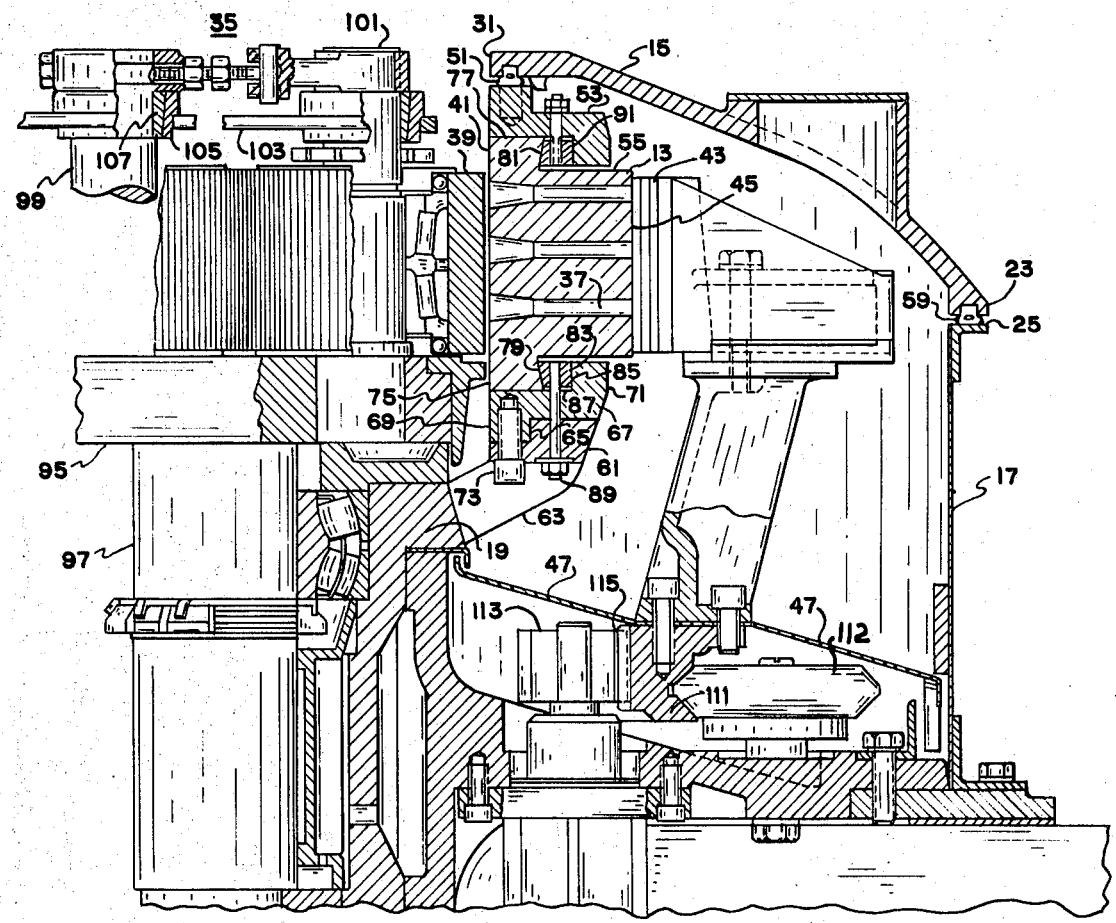
FIG. 2 is a cross-sectional side elevation of a portion of the internal structure of the extrusion mill of the present invention taken along line 2—2 of FIG. 3 and disclosing the extrusion assembly.

Reference is first made concurrently to FIGS. 1 and 2 for a general description of an extrusion mill of the type to which the present invention relates and for a description of the preferred embodiments of the present invention. There shown in perspective and cross section is an extrusion mill 11 which employs a radially perforated, horizontally disposed, extrusion die 13. The cover 15 is shown removed in FIG. 1. An outer housing 17 is mounted on the frame 19 of the extrusion mill to keep all of the extrusion and product material in the machine.

To ready the machine for operation, the cover supported by the jib crane 21 is swung into place by the operator. The lower outer edge 23 of the cover mates with the upper peripheral seating face 25 of the housing. The extrusion material feed chute 27 is then swung into place where its lower annular opening 29 is disposed concentrically on the upper inlet opening 31 of the cover.

In operation, the extrusion material is discharged from primary processor 33 atop the mill and spills down the chute 27 to enter the machine through the opening 31 in the cover. An extrusion assembly 35 is disposed internally of the horizontal annular die 13 and effects the extrusion of the material radially outward through the die holes 37 by means of extrusion rollers 39 which rotate around the inner annular working surface 41 of the die 13. As the extruded material is discharged outward from the die, it is cut off by rotating knives 43 which are driven around the outer peripheral surface 45 of the die. As the extruded material is cut off, it drops into the upper portion of the mill housing and onto a rotating sloped apron 47. The apron centrifugally throws the pellets to the outer housing wall 17 and they are swept into a collecting chute 49 at one side of the machine.

The cover 15 is held in operating position simply by its mass. Locating means, such as male and female members on respective portions of the die securing ring and the cover, can be used to locate the cover concentric with the die.

Internally of the cover, and disposed around the edge of the inlet opening 31, is a seal or gasket 51 which fits on a reinforcing ring 53 secured to the top edge 55 of the die. The lower outer edge 23 of the cover likewise has a seal 59 which fits on the upper edge 25 of the housing.

The frame of the extrusion mill forms a horizontal stationary support ring 61 for the extrusion die. The support ring projects outward from the frame 19 by means of a number of radical support arms 63.

An important feature of the present invention is the die securing means which secures the die 13 to the support ring 61. An annular recess 65 is formed in the inner edge of the support ring. A unitary reinforcing ring 67 is provided which has a projecting inner annular or lower flange 69 which fits within the annular recess 65 of the support ring. The reinforcing ring also has an oppositely projecting or upper annular flange 71 which is disposed around its opposite outer edge. The unitary reinforcing ring is secured to the support ring by means of bolts 73 which project through the support ring and engage the lower annular flange 69 of the reinforcing ring. The reinforcing ring is made of hardened steel and is accurately machined.

The radially perforated annular die 13 is disposed concentrically on the support and reinforcing rings and has mirror image first, or lower, and second, or upper, annular trapezoidal flanges 75, 77 respectively. The flanges are characterized by undercut or re-entrant outer peripheral faces 79, 81.

A segmental wedge ring 83 is provided and has a cross section complementary to the first trapezoidal flange 75 of the die. It is necessary that the wedge ring be made in segments in order to fit around the re-entrant peripheral face of the die. However, it could be simply split at one point and stretched to fit around the die. In this respect, the context of the term segmental is meant to include a ring which is simply split at one point as well as a ring split into two or more pieces.

When the wedge ring is placed in operating position, it has its outer peripheral face 85 abutting the inner peripheral face 87 on the outer or upper flange 71 of the reinforcing ring 67. The wedge ring engages the lower trapezoidal flange 75 of the die in captured relation whereby as the wedge ring is drawn toward the reinforcing ring, the die is forced to seat against the reinforcing ring. In the preferred embodiment, the wedge ring is tightened by studs 89 which project through the support ring and the reinforcing ring to engage the segmental wedge ring 83. Other clamping means than those here shown could be used.

An upper reinforcing ring 53 and a wedge ring 91 are secured to the upper flange 77 of the die and form a sealing surface for the cover of the mill. More importantly they strengthen the die, but they are unnecessary to the proper functioning of the invention. In fact, the upper trapezoidal flange is unnecessary, but it has the important advantage of making the die reversible.

A roller type extrusion assembly 93 is supported on a radial flange 95 of the main drive shaft 97. The roller assembly includes at least one main shaft drive post 99 which is secured to the drive shaft. In the preferred embodiment, a press fit is used to secure the drive post to the flange to prevent its working loose during operation. At least one roller journal shaft 101 is journalled at its lower end in the flange 95 of the main drive shaft and supports an extrusion roller 39 journalled thereon. Both the drive post and the journal shaft are arranged parallel the axis of rotation of the main drive shaft.

In practice, these elements, the main shaft drive post 99 and the roller journal shaft 101, are usually provided in pairs or a symmetrical threesome to balance the extrusion forces on the internal surface of the die.

Figure 3:
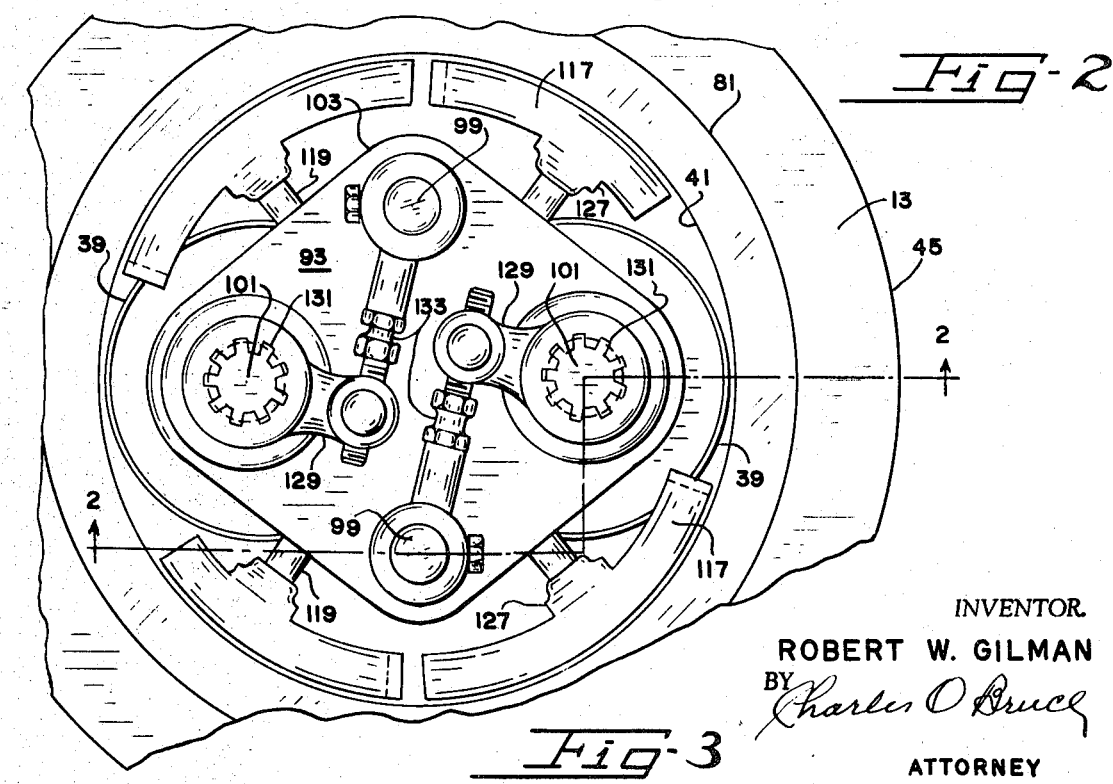
FIG. 3 is a plan view of a portion of the extrusion mill of the present invention showing the die and the elements internal thereto.
Figure 4:
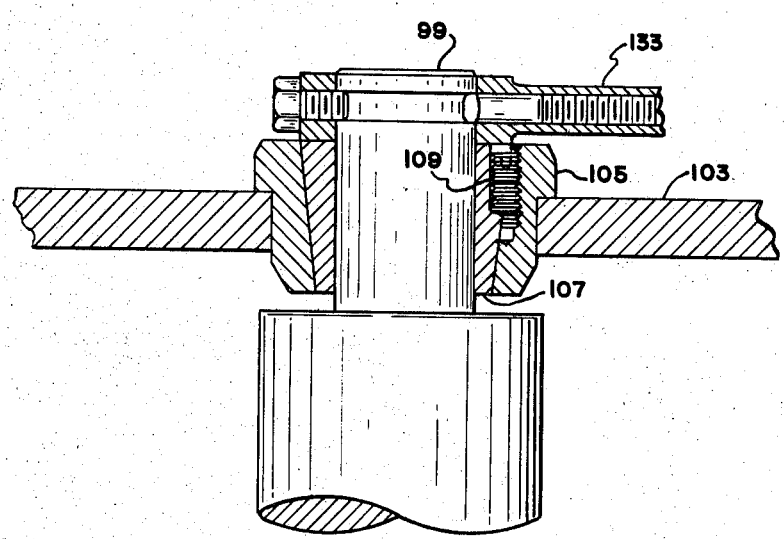
FIG. 4 is a partial sectional view in side elevation of the top end of a main shaft drive post and drive plate of the roller assembly.
Figure 5:
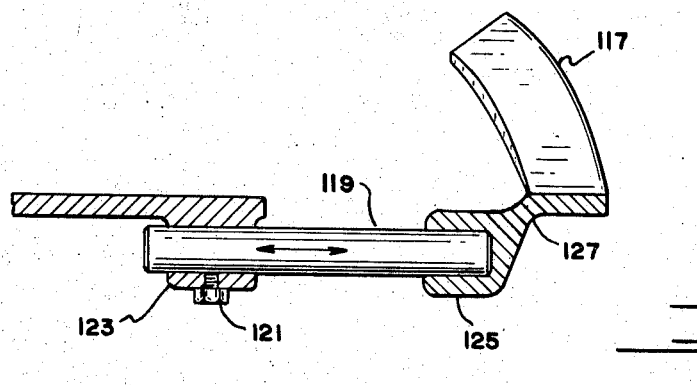
FIG. 5 is a partial sectional view in side elevation of one of the flow retarders of the present invention.
Figure 6:
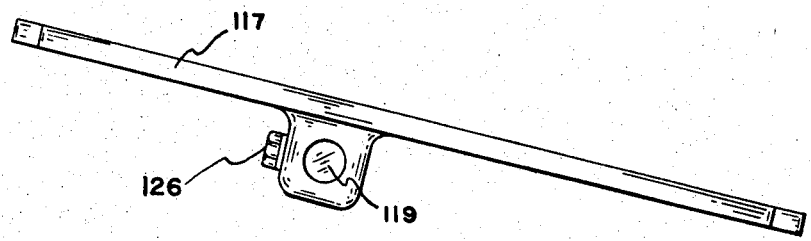
FIG. 6 is an end elevation of one of the flow retarders of the present invention.

Reference to FIGS. 2, 3, and 4 will aid in understanding the arrangement of the extrusion assembly 35 of the present invention. There shown are a pair of main shaft drive posts 99 disposed opposite each other and a pair of roller journal shafts 101 also disposed opposite each other. In the preferred embodiment, these posts and shafts are disposed on symmetrical axes with respect to the drive shaft and the corresponding posts or shafts are disposed equidistant on those axes from the drive shaft. The extrusion rollers 39 are journalled on the roller journal shafts and operate by rotating around the internal surface 41 of the extrusion die.

Also included as a particular feature of the present invention is the extrusion roller retaining means which comprises a drive plate 103 secured to both the main shaft drive posts 99 and the roller journal shafts 101. This element is most clearly illustrated in FIGS. 2 and 4. The drive plate is secured to the upper ends of the drive posts and the roller journal shafts by means of a device which is known in the trade as a "Taper Lock" (the registered trademark of the manufacturer of the device). The outer sleeves 105 thereof are secured to the drive plate while the inner sleeves 107, which are of a split ring configuration, are wedged into engagement with the posts and shafts when the outer sleeves are drawn tight on the inner sleeves by means of inserted setscrews 109.

The drive plate is secured to the posts and shafts on the opposite side of the rollers 39 from the drive shaft flange whereby the roller is captured between the flange and the plate. The drive plate also provides the function of supporting the upper end of the journal shafts in position with respect to their journals in the drive shaft flange. More importantly, the drive plate securely holds the rollers in place whereby they track accurately around the internal surface of the extrusion die and cannot work off the roller shafts.

The rotating knives 43 which sever the projecting extruded material into pellets are supported by a turntable 111 mounted on rollers 112. The speed of the knives can be varied to control pellet length. The turntable is driven by means of a pinion gear 113 which meshes with a ring gear 115 provided internally on the turntable.

A further characteristic of the present invention is the extrusion material flow retarders. These include a multiplicity of helical like blades 117 which extend from the roller assembly drive plate 103. These blades can actually be formed from segments of annular disks. Each of the extrusion rollers 39 has at least one helical like blade supported ahead of and above it and inclined downward in the direction of rotation of the roller assembly. In the preferred embodiment, there are two blades for each roller both of which are disposed in front of the individual roller. The blades support the overlying mass of material being forced downwardly by gravity into the path of the rollers between the rollers and the die. They operate in reverse to a digging screw and hold up the mass and retard its downward flow.

Each of the blades 111 is supported by a shaft 119 which is adjustably secured to the drive plate of the roller assembly whereby each of the helical like blades is adjustable radially inward and outward of the roller assembly, and each is also rotatable with respect to the horizontal whereby its angle of inclination or pitch is adjustable. This is effected by means of a setscrew 121 in a socket 123 secured to the drive plate in which the blade supporting shaft 119 is retained.

The blades have an extension 125 which projects laterally and radially inward of the blade to engage with the supporting shaft 119 by means of a setscrew 126. The extension is formed with a thin neck 127 so as to not appreciably increase the thickness of its blade at the connection of the extension with the blade. This is effected by making an edge connection of the blade 117 with the extension 125. It has been found that when the shaft is extended radially outward of the roller assembly under the blade, so that the thickness of the shaft extends below the blade, that the shaft drags extrusion material along with it and clogs the roller feeding operation.

It is a further characteristic of the present invention that it is provided with a novel roller adjustment means which utilizes an eccentric relation between the journal center and the roll center of the roller journal shaft controlled by a rigid turnbuckle assembly. As the roll journal shaft is rotated within its journal by the turnbuckle, the center of rotation of the extrusion roller is changed and describes a circular path. Thus, as the roller journal shaft is turned, the extrusion roller can be moved toward or away from the working surface or the inner annular face of the extrusion die.

Referring to FIGS. 3 and 4, radical extension arms 129 are secured to the roller shafts 101 by splines 131 which run parallel the axis of the roller shafts. Turnbuckle means 133 extend between the main shaft drive posts 99 and the extension arms. The turnbuckle means engage with the radial extension arms in such a manner that as the turnbuckle means are lengthened or shortened the radial extension arms turn or rotate the roller journal shaft 101. The changing of the length of the turnbuckle means varies the position of the roll center of the roller journal shafts with respect to the die and thus permits adjustments of the position of the extrusion roller with respect to the die. The turnbuckle means 133 is secured to the drive posts by means of setscrews which further prevent the plate 103 from lifting off the posts.

The adjustment length of the turnbuckle means is at least, and is preferably slightly more than, equal to the angular rotation of shifting the extension arm on the roller shaft one set of splines 131. Thus, if retracting the turnbuckle means its full length does not produce satisfactory adjustment, the turnbuckle means can be extended to its initial length and the extension arm lifted off the roller journal shaft and rotated with respect to the roller journal shaft one set of splines. Then a new range of adjustment is available which starts at the point the last range of adjustment ended. In other words, when the extension arm is lifted off and indexed one notch, another full run of adjustment through the turnbuckle is available to effect proper adjustment of the roller with respect to the die.

Due to the use of a turnbuckle for the adjustment means, the roller adjustment means is infinitely adjustable along its range of adjustment which in turn is governed by the length of the offset between the roll center and the journal center of the roller journal shaft.

When the particular portions of the present invention are combined, a novel and improved extrusion assembly for an extrusion mill employing a radially perforated die is effected. The new extrusion assembly combines the die-securing means, the flow retarders, the roller-retaining means, and the roller adjustment means into an improved walking die pellet mill.

There are numerous advantages over the prior art provided by the features of the present invention. For one, there is no elaborate milling work required on the die itself, which is made of a very hard material to resist wear, and there is no need for drilling and threading bolt holes in the die.

The wedge ring of the present invention, in addition to holding the die down in position, gives tight reinforcement to transmit the loading forces from the rollers through the die and onto the reinforcing rings. Generally, whenever a die is reinforced by a removable piece, there is a certain amount of clearance and freedom which reduces the effectiveness of the reinforcing ring. If a reinforcing ring of a given size is forged integral with the die, its supporting ability is superior to a ring which must be loosely fitted so it can be removed, but the integral reinforcing ring is very difficult to remove and usually this cannot be done in the "field." The present invention provides a wedge ring which can be removed so that reinforcing ring, or the die, or both, can easily be removed or exchanged, but when the wedge ring is tight, it makes available the maximum supporting value out of the reinforcing ring.

Another advantage is that the reinforcing ring and the die are of hardened material while the wedge rings are not so that any wear which occurs is absorbed by the wedge ring. This is a relatively simple and inexpensive part which is easily replaced after excessive wear occurs.

The structural arrangement of the die securing means of the present invention permits the extrusion forces to be completely absorbed. In doing this, the die is permitted to "walk." In conventional extrusion assemblies utilizing roller assemblies that traverse the interior face of annular dies, the torque of the extrusion rollers tends to be transmitted to the die and tends to rotate the die on the support ring. This produces a tendency to walk and is the primary cause of dies working loose during operation. Numerous bolts must be employed when securing a die in the conventional manner to prevent walking. The present invention reduces this tendency to walk while permitting it to occur and eliminates the problems of the prior art.

In the present invention, the initial axial clamping pressure of the split wedge ring die securing means is relied upon to prevent rotation of the die. Once pelleting begins, the outward radial pressure of the die against the flange of reinforcing ring, of the support ring, transmitted by the wedge ring, produces additional frictional restraining force to prevent slippage. However, the difference in diameter between the die and the supporting ring, i.e., the clearance, causes the die to rotate because of differential action. The wedging action of the reinforcing ring of the present invention eliminates radial clearance and thereby the tendency to walk. However, should clearance develop in operation, the die is free to walk and does not develop undesirable stresses.

The flow retarders have proven in operation to solve the problem they were conceived for. They reduce uneven wear on the die and permit a more uniform product to be produced from a horizontal radially perforated die.

The new and improved roller retaining means effects a solution to the problem of rollers working loose and riding out of the die while the new and improved roller adjustment means permits an infinitely accurate adjustment of the rollers with respect to the die.

It will be apparent from the foregoing description of the invention, in its preferred form, that it will fulfill all the objects attributable thereto. While it has been illustrated and described in considerable detail, the invention is not to be limited to such details as have been set forth except as may be necessitated by the appended claims.

I claim:

1. In an extrusion mill having a frame forming a stationary support ring surrounded by a housing, an improved die securing means comprising:
   a radially perforated annular die disposed concentrically on said support ring and having at least a first annular trapezoidal flange disposed at the bottom thereof adjacent said support ring,
   a segmental wedge ring having a cross section complementary to the first trapezoidal flange of said die disposed between said die and said support ring, said wedge ring being secured to said support ring and engaging said die in captured relation.

2. The die securing means of claim 1 wherein said support ring includes an annular recess and a reinforcing ring is disposed between said die and said support ring, said reinforcing ring having a projecting annular flange fitting the annular recess of said support ring and an oppositely projecting annular flange for receiving the first flange of said die and said wedge ring.

3. The die securing means of claim 2 wherein said reinforcing ring is secured to said support ring and clamping means are provided for interlocking said support ring, said reinforcing ring, and said wedge ring.

4. The die securing means of claim 2 wherein the trapezoidal flanges of said die are characterized by an undercut outer peripheral face and said support ring includes a projecting annular flange surrounding the outer peripheral face of said wedge ring whereby as said wedge ring is drawn toward said support ring during securement thereto said die is forced against said reinforcing ring.

5. The die securing means of claim 1 wherein said annular die has a mirror image second annular trapezoidal flange disposed at the top thereof and said wedge ring is engageable with said second trapezoidal flange when said die is inverted whereby said die is reversible to permit compensation for unequal wear of the inner annular surface thereof.

6. In an extrusion mill having a frame forming a horizontal stationary support ring surrounded by a housing, an improved die securing means comprising:
   an annular recess in the inner edge of said support ring,
   a unitary reinforcing ring secured to said support ring, said reinforcing ring including a projecting inner annular flange fitting the annular recess of said support ring and an oppositely projecting annular flange disposed around its outer edge,
   a radially perforated annular die disposed concentrically on said reinforcing ring and having mirror image first and second annular trapezoidal flanges, said flanges characterized by an undercut outer peripheral face, a segmental wedge ring having a cross section complementary to the first trapezoidal flange of said die, said wedge ring having its outer peripheral face abutting the inner peripheral face on the outer flange of said reinforcing ring and said wedge ring engaging the lower trapezoidal flange of said die in captured relation whereby as said wedge ring is drawn toward said reinforcing ring during securement thereto said die is forced to seat against said reinforcing ring, clamping means for interlocking said support ring, said reinforcing ring, and said wedge ring, and a reinforcing ring and a wedge ring secured to the second flange of said die for forming a sealing surface for a cover to said mill.

7. An improved extrusion assembly for an extrusion mill comprising:

a frame forming a horizontal stationary support ring, a radially perforated annular die disposed horizontally on said support ring and having mirror image upper and lower annular trapezoidal flanges, a segmental wedge ring having a cross section complementary to the lower trapezoidal flange of said die disposed between said die and said support ring, said wedge ring being secured to said support ring and engaging said die in captured relation, said wedge ring engageable with the upper of said trapezoidal flanges of said die when said die is inverted whereby said die is reversible, a main drive shaft supported for rotation concentric to said die and having at least one fixed drive shaft post, a roller assembly supported by said main drive shaft and including at least one extrusion roller journalled on a roller journal shaft journalled in said drive shaft, material flow retarders including:

at least one helical blade supported ahead of and above said roller and inclined downward in the direction of rotation of said roller assembly to support the overlying mass of material being fed downwardly by gravity into the path of said roller between said roller and said die, and means for rotating said blade ahead of said roller in spaced relation thereto, and a roller adjustment means including:

an eccentric relation between the journal center and the roll center of said roller journal shaft, a radial extension arm secured to said roller shaft, and turnbuckle means extending between said main shaft drive post and said extension arm whereby as the length of said turnbuckle is changed said roller shaft is rotated within its journal in said drive shaft to vary the position of the roll center of said roller journal shaft with respect to said die.

8. An extrusion mill comprising:

a frame forming a horizontal stationary support ring surrounded by a housing, a horizontal radially perforated annular extrusion die concentrically mounted on said support ring, a die securing means including:

an annular recess in the inner edge of said support ring, a unitary reinforcing ring secured to said support ring, said reinforcing ring including a projecting inner annular flange fitting the anular recess of said support ring and an oppositely projecting annular flange disposed around its outer edge, a radially perforated annular die disposed concentrically on said reinforcing ring and having mirror image upper and lower annular trapezoidal flanges, said flanges characterized by an undercut outer peripheral face, a segmental wedge ring having a cross section complementary to the first trapezoidal flange of said die, said wedge ring having its outer peripheral face abutting the inner peripheral face on the outer flange of said reinforcing ring and said wedge ring engaging the lower trapezoidal flange of said die in captured relation whereby as said wedge ring is drawn toward said reinforcing ring during securement thereto said die is forced against said reinforcing ring, clamping means for interlocking said support ring, said reinforcing ring, and said wedge ring, and a reinforcing ring and a wedge ring secured to the second flange of said die for forming a sealing surface for a cover to said mill, a main drive shaft supported for rotation concentric to said die and having at least one fixed main shaft drive post, a roller assembly supported by said main drive shaft and including at least one extrusion roller journalled on a roller journal shaft journalled in said main drive shaft, a drive plate secured to said main shaft drive post and said journal shaft, the journalling of said journal shaft in said main shaft being effected on the opposite side of said roller from said drive plate whereby said roller is captured between said flange and said plate, extrusion material flow retarders having a multiplicity of helical blades extending from said drive plate, each of said rollers having at least one of said blades supported ahead of and above it and inclined downward in the direction of said roller assembly to support the overlying mass of material being fed downwardly by gravity into the path of said rollers between said rollers and said die, a shaft for each of said blades adjustably supported by said roller assembly drive plate, and an extension projecting laterally and radially inward of each of said blades to engage with said shafts, said extensions not appreciably increasing the thickness of said blades at their connections therewith, a roller adjustment means having:

an eccentric relation between the journal center and the roll center of said roller journal shaft, a radial extension arm secured to said roller shaft by splines, and turnbuckle means extending between said main shaft drive post and said extension arm whereby as the length of said turnbuckle means is changed said roller shaft is rotated within its journal in said drive shaft to vary the position of the roll center of said roller journal shaft with respect to said die, the adjustment length of said turnbuckle means being at least equal to the annular rotation of shifting said radial extension arm on said roller shaft one set of splines.

References Cited

UNITED STATES PATENTS

| | | | |
|---|---|---|---|
| 2,648,296 | 8/1953 | Oliver | 18—12X |
| 2,764,951 | 10/1956 | Fisher | 18—12X |
| 2,908,038 | 10/1959 | Meakin | 18—12 |
| 2,994,918 | 8/1961 | Landers | 18—12 |
| 3,010,510 | 11/1961 | Meakin. | |
| 3,167,813 | 2/1965 | Keefe | 18—12 |
| 3,191,227 | 6/1965 | Keefe | 18—12 |
| 3,280,426 | 10/1966 | Meakin | 18—12 |

J. SPENCER OVERHOLSER, Primary Examiner